US010793769B2

(12) United States Patent
Nguyen et al.

(10) Patent No.: US 10,793,769 B2
(45) Date of Patent: Oct. 6, 2020

(54) COMPOSITIONS INCLUDING ACIDIC CHELATOR FOR TREATMENT OF SUBTERRANEAN FORMATIONS INCLUDING ONE OR MORE FRACTURES

(71) Applicant: Halliburton Energy Services, Inc., Houston, TX (US)

(72) Inventors: Philip D. Nguyen, Houston, TX (US); Matthew Lewis Lahman, Houston, TX (US); Aaron Gene Russell, Humble, TX (US); Dipti Singh, Kingwood, TX (US); Prashant D. Chopade, Kingwood, TX (US); Travis Hope Larsen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/752,675

(22) PCT Filed: Sep. 23, 2015

(86) PCT No.: PCT/US2015/051730
§ 371 (c)(1),
(2) Date: Feb. 14, 2018

(87) PCT Pub. No.: WO2017/052537
PCT Pub. Date: Mar. 30, 2017

(65) Prior Publication Data
US 2018/0258342 A1    Sep. 13, 2018

(51) Int. Cl.
*C09K 8/74* (2006.01)
*C09K 8/64* (2006.01)
(Continued)

(52) U.S. Cl.
CPC ............... *C09K 8/74* (2013.01); *C04B 28/02* (2013.01); *C09K 8/52* (2013.01); *C09K 8/536* (2013.01);
(Continued)

(58) Field of Classification Search
CPC . C09K 8/74; C09K 8/536; C09K 8/64; C09K 8/685; C09K 8/82; C09K 8/887;
(Continued)

(56) References Cited

U.S. PATENT DOCUMENTS 4,359,391 A    11/1982    Salathiel et al.
5,224,546 A    7/1993    Smith et al.
(Continued)

FOREIGN PATENT DOCUMENTS

CA    2234386    8/1998
EP    1442198    8/2006
(Continued)

OTHER PUBLICATIONS

International Search Report and Written Opinion of PCT Application No. PCT/US2015/051730 dated Jun. 23, 2016: pp. 1-26.
(Continued)

*Primary Examiner* — Crystal J Miller
(74) *Attorney, Agent, or Firm* — Chamberlain Hrdlicka

(57) ABSTRACT

Various embodiments disclosed relate to compositions including acidic chelator or salt or ester thereof for treatment of subterranean formations including one or more fractures. In various embodiments, the present invention provides a method of treating a subterranean formation. The method includes placing in the subterranean formation a composition including an acidic chelator or a salt or ester thereof. The subterranean formation includes one or more fractures.

19 Claims, 3 Drawing Sheets

(51) Int. Cl.
    *C09K 8/68*     (2006.01)
    *C09K 8/82*     (2006.01)
    *C09K 8/88*     (2006.01)
    *C09K 8/52*     (2006.01)
    *C04B 28/02*     (2006.01)
    *C09K 8/536*     (2006.01)
    *E21B 43/26*     (2006.01)
    *C09K 8/50*     (2006.01)
    *C09K 8/528*     (2006.01)
    *C09K 8/42*     (2006.01)

(52) U.S. Cl.
    CPC ............ *C09K 8/64* (2013.01); *C09K 8/685* (2013.01); *C09K 8/82* (2013.01); *C09K 8/887* (2013.01); *E21B 43/26* (2013.01); *C09K 8/42* (2013.01); *C09K 8/50* (2013.01); *C09K 8/528* (2013.01); *C09K 2208/08* (2013.01); *C09K 2208/24* (2013.01); *C09K 2208/26* (2013.01)

(58) Field of Classification Search
    CPC .. C09K 2208/24; C09K 2208/26; E21B 43/26
    See application file for complete search history.

(56) References Cited

U.S. PATENT DOCUMENTS

| | | |
|---|---|---|
| 6,207,620 B1 | 3/2001 | Gonzalez et al. |
| 6,749,022 B1 * | 6/2004 | Fredd ............ C09K 8/66 166/250.1 |
| 8,551,926 B2 | 10/2013 | Huang et al. |
| 2006/0011342 A1 | 1/2006 | Lizak |
| 2006/0018999 A1 | 1/2006 | Risch |
| 2006/0046938 A1 | 3/2006 | Harris et al. |
| 2008/0066916 A1 * | 3/2008 | Li ............ C09K 8/602 166/305.1 |
| 2012/0097392 A1 | 4/2012 | Reyes et al. |
| 2013/0284437 A1 | 10/2013 | Nguyen et al. |
| 2014/0034309 A1 | 2/2014 | Saini et al. |
| 2014/0050818 A1 | 2/2014 | Boghani et al. |
| 2014/0073540 A1 | 3/2014 | Berry et al. |
| 2014/0367100 A1 * | 12/2014 | Oliveira ............ C09K 8/80 166/280.1 |
| 2015/0075797 A1 * | 3/2015 | Jiang ............ E21B 43/283 166/307 |

FOREIGN PATENT DOCUMENTS

| | | | | |
|---|---|---|---|---|
| WO | 0075486 | | 12/2000 | |
| WO | 2007095939 | | 8/2007 | |
| WO | 2012171857 | | 12/2012 | |
| WO | 2012171858 | | 12/2012 | |
| WO | 2012171858 A1 | | 12/2012 | |
| WO | WO-2015041678 A1 * | 3/2015 | ............ E21B 43/26 |
| WO | 2015088561 | | 6/2015 | |
| WO | WO-2015088561 A1 * | 6/2015 | ............ C09K 8/74 |

OTHER PUBLICATIONS

Kresse, Olga, et al., "Effect of Flow Rate and Viscosity on Complex Fracture Development in UFM Model", INTECH, 2013, pp. 28.

* cited by examiner

COMPOSITIONS INCLUDING ACIDIC CHELATOR FOR TREATMENT OF SUBTERRANEAN FORMATIONS INCLUDING ONE OR MORE FRACTURES

BACKGROUND

During stimulation phases of wells for petroleum or water extraction, the use of acid fracturing compositions can etch or form wormholes in the faces of the subterranean formation, providing greater overall permeability. However, by including the acidic materials in the fracturing fluid used to form the fractures desired to be acid treated, the acidic materials can be substantially spent (e.g., neutralized) before formation of the fractures. As a result, activity of the acidic materials can be limited to near-wellbore areas.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
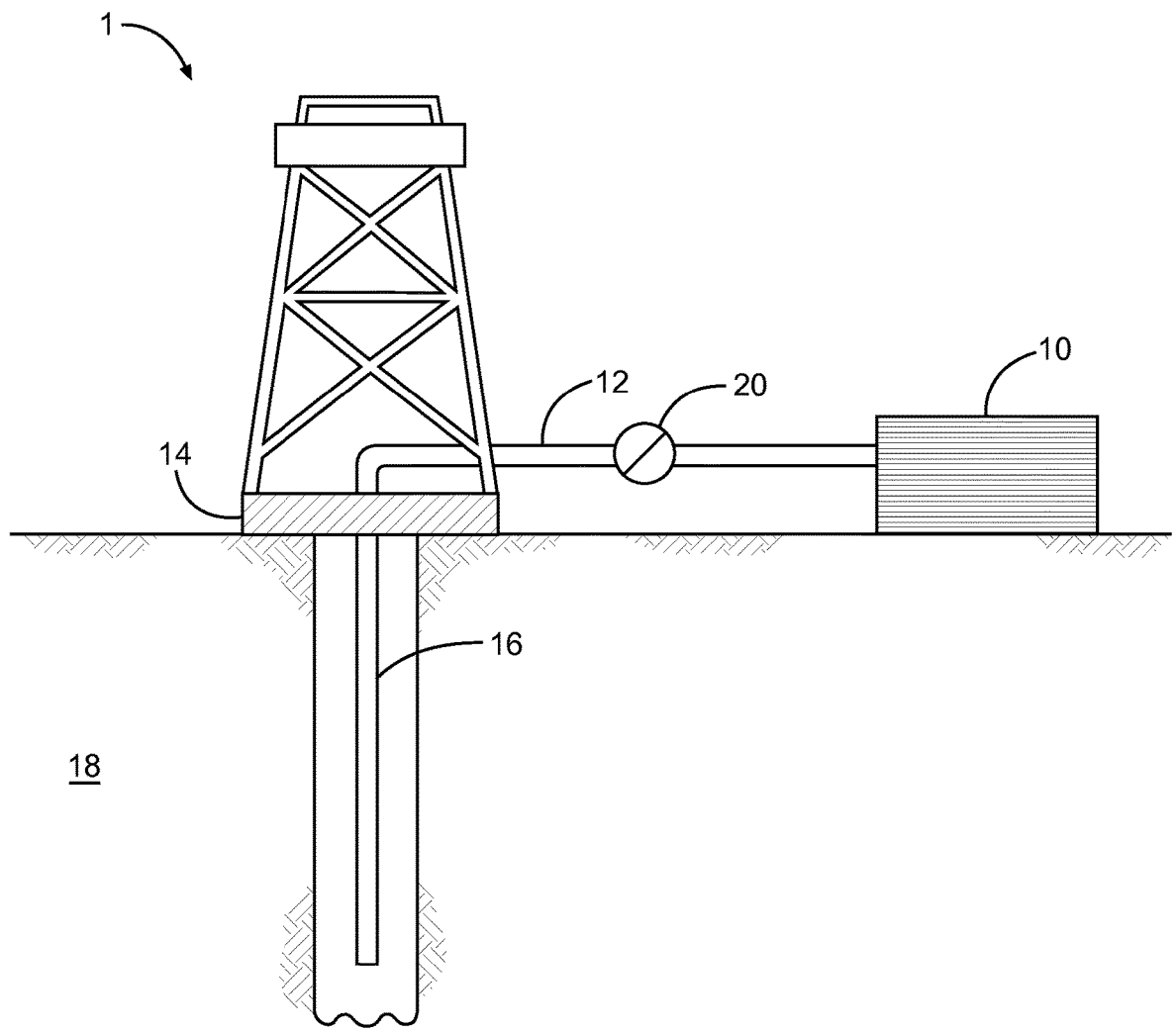
FIG. 1 illustrates a system or apparatus for delivering a composition to a subterranean formation, in accordance with various embodiments.
Figure 2B:
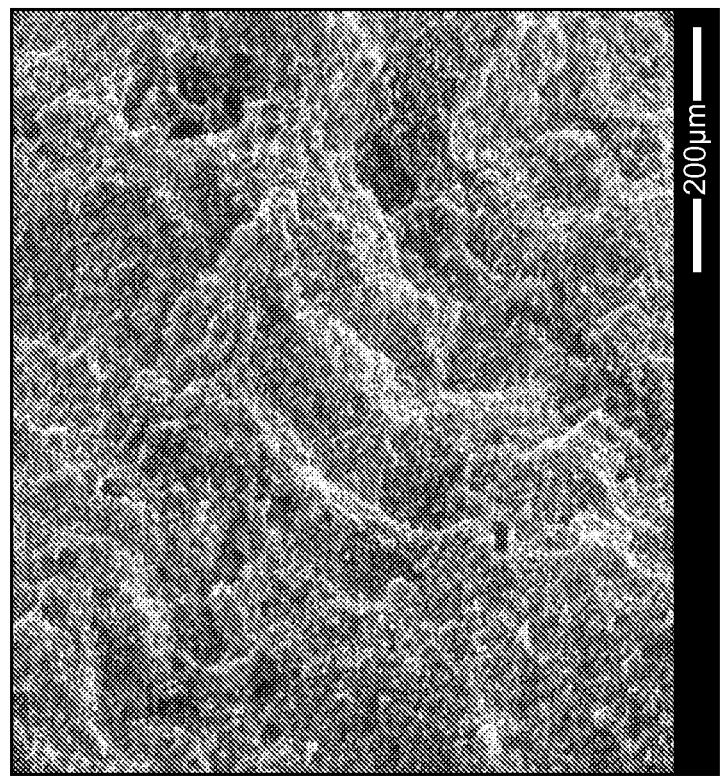
FIGS. 2A-D illustrate N-(phosphonomethyl)iminodiacetic acid-treated core samples, in accordance with various embodiments.
Figure 2A:
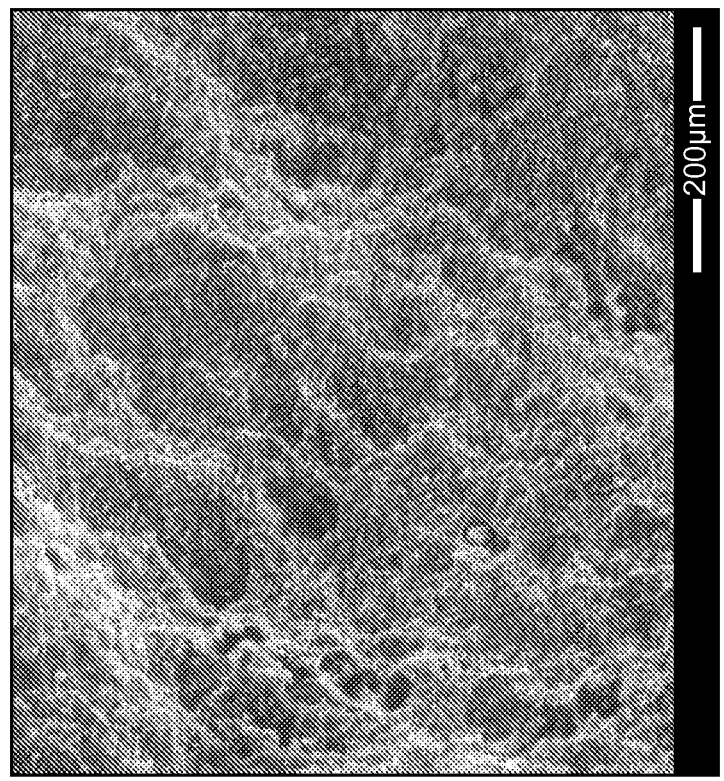
Figure 2D:
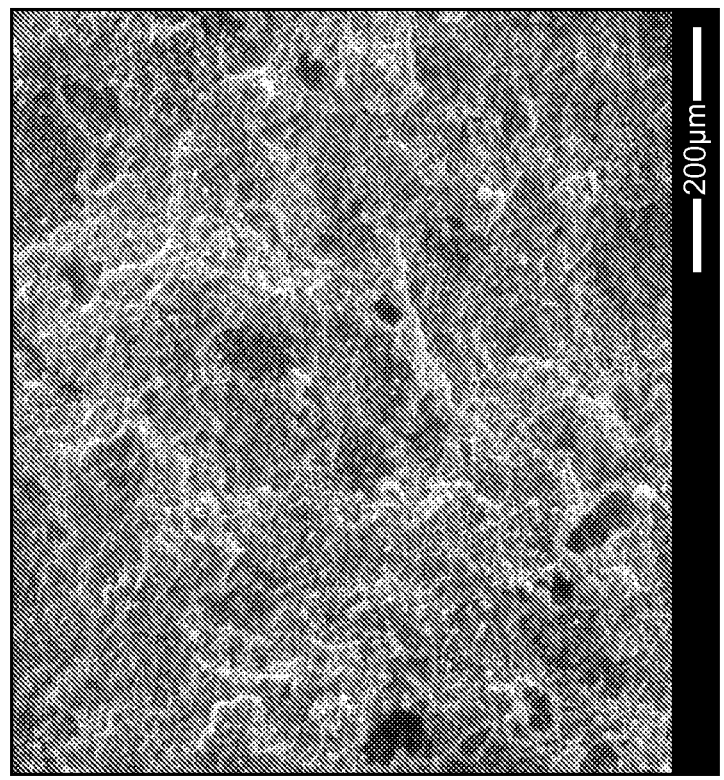
Figure 2C:
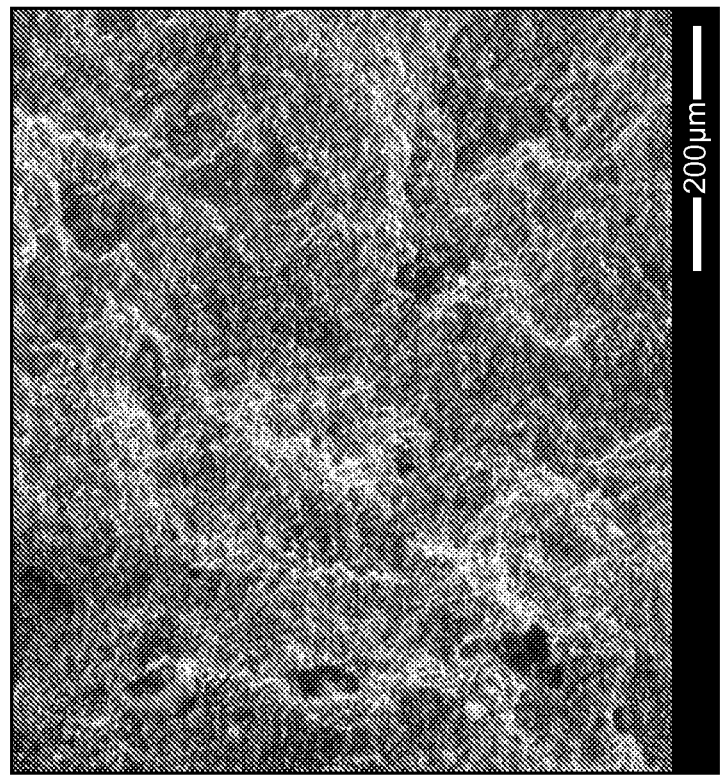

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

In this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "organic group" as used herein refers to any carbon-containing functional group. Examples can include an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can itself be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N (R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "hydrocarbon" or "hydrocarbyl" as used herein refers to a molecule or functional group, respectively, that includes carbon and hydrogen atoms. The term can also refer to a molecule or functional group that normally includes both carbon and hydrogen atoms but wherein all the hydrogen atoms are substituted with other functional groups. A hydrocarbyl group can be a functional group derived from a straight chain, branched, or cyclic hydrocarbon, and can be alkyl, alkenyl, alkynyl, aryl, cycloalkyl, acyl, or any combination thereof. Hydrocarbyl groups can be shown as (C$_a$-C$_b$)hydrocarbyl, wherein a and b are positive integers and mean having any of a to b number of carbon atoms. For example, (C$_1$-C$_4$)hydrocarbyl means the hydrocarbyl group can be methyl (C$_1$), ethyl (C$_2$), propyl (C$_3$), or butyl (C$_4$), and (C$_0$-C$_b$)hydrocarbyl means in certain embodiments there is no hydrocarbyl group.

The term "solvent" as used herein refers to a liquid that can dissolve a solid, liquid, or gas. Non-limiting examples of solvents are silicones, organic compounds, water, alcohols, ionic liquids, and supercritical fluids.

The term "room temperature" as used herein refers to a temperature of about 15° C. to 28° C.

The term "standard temperature and pressure" as used herein refers to 20° C. and 101 kPa.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "fracturing fluid" refers to fluids or slurries used downhole during fracturing operations.

As used herein, the term "remedial treatment fluid" refers to fluids or slurries used downhole for remedial treatment of a well, and can also be called a "work-over fluid." Remedial treatments, also called work-over treatments, can include treatments designed to increase or maintain the production rate of a well, such as stimulation or clean-up treatments.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including stimulation, hydraulic fracturing, clean-up, acidizing, remedial treatment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product or fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium (Li). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

In various embodiments, salts having a negatively charged counterion can include any suitable negatively charged counterion. For example, the counterion can be a halide, such as fluoride, chloride, iodide, or bromide. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thiosulfate, sulfite, carbonate, chromate, dichromate, peroxide, or oxalate.

The polymers described herein can terminate in any suitable way. In some embodiments, the polymers can terminate with an end group that is independently chosen from a suitable polymerization initiator, —H, —OH, a substituted or unsubstituted ($C_1$-$C_{20}$)hydrocarbyl (e.g., ($C_1$-$C_{10}$)alkyl or ($C_6$-$C_{20}$)aryl) interrupted with 0, 1, 2, or 3 groups independently selected from —O—, substituted or unsubstituted —NH—, and —S—, a poly(substituted or unsubstituted ($C_1$-$C_{20}$)hydrocarbyloxy), and a poly(substituted or unsubstituted ($C_1$-$C_{20}$)hydrocarbylamino).

In various embodiments, the present invention provides a method of treating a subterranean formation. The method includes placing in the subterranean formation a composition including an acidic chelator or a salt or ester thereof. The subterranean formation includes one or more fractures.

In various embodiments, the present invention provides a method of treating a subterranean formation. The method includes placing in the subterranean formation a composition including an acidic chelator that is N-phosphonomethyl iminodiacetic acid (PMIDA). The subterranean formation includes one or more fractures. The acidic chelator is about 0.01 wt % to about 10 wt % of the composition.

In various embodiments, the present invention provides a system including a tubular disposed in a subterranean formation including one or more fractures. The system also includes a pump configured to pump a composition including an acidic chelator or a salt or ester thereof in the subterranean formation through the tubular.

In various embodiments, the present invention provides a composition for treatment of a subterranean formation including one or more fractures. The composition includes an acidic chelator or a salt or ester thereof.

In various embodiments, the present method has certain advantages over other methods of using acidic chelators, at least some of which are unexpected. For example, in various embodiments, by generating fractures prior to placing the acidic chelator in the subterranean formation, the acidizing activity of the acidic chelator is conserved, as compared to conventional fracture acidizing methods. In various embodiments, by conserving the acidizing activity of the acidic chelator, the acidizing activity is not limited to near-wellbore areas, and more effective etching and wormholing into and along the faces of the fractures is provided.

In various embodiments, the method provides more effective acidizing of far-field fractures in the subterranean formation. In various embodiments, the etching and wormholing provided by the acidic chelator can form wider gaps and channels along the fracture faces, such as in far-field fracture faces, than other acidizing techniques. In various embodiments, the etching and wormholing formed by the acidic chelator can serve as initiation points for formation of additional fractures, allowing the formation of deeper fracture networks. In various embodiments, the acidic chelator can enhance connectivity between pores and between microfractures more effectively than other acidizing techniques, such as far-field pores and microfractures. In various embodiments, the method provides acidized fracture networks that have greater conductivity, as compared to those provided by other methods.

In various embodiments, the acidic chelator can be low cost, providing an economical stimulation technique that can be used broadly with complex fracture networks to enhance well production. In various embodiments, the acidic chelator can help to remove filter cake that may have been forming during the generation of one or more fractures, such as dominant fractures. In various embodiments, the more effective acidizing provides an alternative approach to enhancing conductivity of far-field microfractures, as compared to merely placing microproppant in these fractures.

In various embodiments, the present invention takes advantage of the way dominant primary fractures and secondary microfractures are generated (including, e.g., opening up natural fractures), such that the acid chelator can be placed in these microfractures to greatly enhance conductivity, as compared to techniques wherein the acidizing energy of the acidic chelator is mainly spent prior to reaching the microfractures.

Method of Treating a Subterranean Formation.

In various embodiments, the present invention provides a method of treating a subterranean formation. The method includes placing a composition including an acidic chelator or a salt or ester thereof in a subterranean formation. The subterranean formation includes one or more fractures at the time of placing the composition in the subterranean formation, or at the time the composition enters a fracture or fracture network (e.g., from a wellbore) that includes the one or more fractures. The faces of the one or more fractures of the subterranean formation are acidized by the acidic chelator. For example, the acidic chelator etches the faces of the one or more fractures, forms wormholes in the faces of the one or more fractures, forms wormholes along the faces of the one or more fractures, or any combination thereof. In contrast to other methods wherein an acidic composition is used for both fracturing and etching, in various embodiments the one or more fractures in the subterranean formation that are etched or wormholed by the acidic chelator are already present in the subterranean formation when the composition is placed in the subterranean formation. In some embodiments, the composition including the acidic chelator or salt or ester thereof can be used to form other fractures in the subterranean formation, which can also be etched or wormholed with the composition; however, at least one of the one or more fractures etched or wormholed by the acidic chelator is formed by another composition or is naturally present prior to contacting the acidic chelator to the one or more fractures.

The placing of the composition in the subterranean formation can include contacting the composition including the acidic chelator or salt or ester thereof and any suitable part of the subterranean formation, or contacting the composition and a subterranean material, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can include at least partially depositing the composition in a fracture, flow pathway, or area surrounding the same. The method can include performing a stimulation treatment at least one of before, during, and after placing the composition in the subterranean formation. The stimulation treatment can be, for example, at least one of perforating, acidizing, injecting of cleaning fluids, propellant stimulation, and hydraulic fracturing. In some embodiments, the method can be or can include a method of stimulation, fracturing, remedial treatment, acidizing, or a combination thereof.

Placing the composition in the subterranean formation including the one or more fractures can enhance conductivity between the one or more fractures, such as between one or more dominant fractures (e.g., main fractures extending from the wellbore), one or more microfractures (e.g., secondary fractures extending from a dominant fracture), or between a dominant fracture and a microfracture. Conductivity can be enhanced via etching or wormholing of the faces of the fractures, which can include connectivity between pores of the fractures.

In some embodiments, etching and wormholing of the faces of the one or more fractures by the composition including the acidic chelator or salt or ester thereof can serve as initiation points for additional stimulation within the same treatment interval, such as fracturing, acidizing, injecting proppant, and the like.

In some embodiments, placing the composition including the acidic chelator or salt or ester thereof in the subterranean formation can at least partially dissolve and remove a filter cake in the subterranean formation, such as a filter cake formed during generation of the one or more fractures that are etched or wormholed by the composition or during formation of other fractures.

The acidic chelator or salt or ester thereof can be placed in the subterranean formation in any suitable form. For example, the acidic chelator or salt or ester thereof can be placed in the subterranean formation as a solid, as a liquid, or as a combination thereof. In some embodiments, by placing the acidic chelator or salt or ester thereof in the subterranean formation in a solid form (e.g., wherein the acidic chelator is a solid, wherein the acidic chelator is encased or absorbed into a solid, or a combination thereof), a delayed release of the acidic chelator can occur as the solid breaks down or as the acidic chelator or salt or ester thereof is dissolved out of the solid. In some embodiments, an acidic chelator or salt or ester thereof in a solid form can be triggered to release the acidic chelator or salt or ester thereof, such as by the action of shear. In some embodiments, an acidic chelator or salt or ester thereof can be encapsulated by a solid material, such as a solid material that is degradable under conditions wherein release of the acidic chelator or salt or ester thereof is desired.

In some embodiments, the acidic chelator or salt or ester thereof can be placed in the subterranean formation as a liquid, such as a solid acidic chelator or salt or ester thereof dissolved in a carrier liquid, or such as a liquid acidic chelator or salt or ester thereof in neat or diluted form. An acidic chelator or salt or ester thereof can be placed in the subterranean formation in the form of an oil-external emulsion, wherein the acidic chelator or salt or ester thereof is neat or diluted in the aqueous phase of the emulsion. Breaking of such an emulsion (e.g., via shear or via introduction of surfactants) can trigger the etching and wormholing action of the acidic chelator. The composition including the acidic chelator or salt or ester thereof can be aqueous (e.g., includes 50 wt % or more of water) or oil-based (e.g., includes 50 wt % or more organic solvents or oil-based materials).

In some embodiments, the method includes obtaining or providing the composition including the acidic chelator or salt or ester thereof. The obtaining or providing of the composition can occur at any suitable time and at any suitable location. The obtaining or providing of the composition can occur above the surface (e.g., one or more components of the composition including the acidic chelator or salt or ester thereof can be combined to form the composition above-surface). The obtaining or providing of the composition can occur in the subterranean formation (e.g., one or more components of the composition including the acidic chelator or salt or ester thereof can be combined to form the composition downhole).

The subterranean formation can be any suitable subterranean formation, such that the method can be performed as described herein. The subterranean formation can include a shale formation, such as a shale formation that includes carbonate minerals. In various embodiments, the acidic chelator or salt or ester thereof avoids degradation of shale in the subterranean formation. In various embodiments, the acidic chelator acts selectively on carbonate minerals in the faces of the one or more fractures in the subterranean formation and preferentially dissolves the carbonate materials over the surrounding materials. The faces of the one or more fractures in the subterranean formation that are etched or wormholed by the composition including the acidic chelator or salt or ester thereof can be in at least part of the shale formation. The faces of the one or more fractures that are etched or wormholed by the composition can be in a shale formation that includes carbonate minerals, such that the faces of the one or more fractures are a combination of shale and carbonate minerals. The carbonate mineral in the shale can be any suitable carbonate mineral, such that the method can be carried out as described herein, such as one or more of calcite ($CaCO_3$), gaspeite (($Ni,Mg,Fe^{2+}$)$CO_3$), magnesite ($MgCO_3$), otavite ($CdCO_3$), rhodochrosite ($MnCO_3$), siderite ($FeCO_3$), smithsonite ($ZnCO_3$), spherocobaltite ($CoCO_3$), aragonite ($CaCO_3$), cerussite ($PbCO_3$), strontianite ($SrCO_3$), witherite ($BaCO_3$), rutherfordine ($UO_2CO_3$), natrite ($Na_2CO_3$), ankerite ($CaFe(CO_3)_2$), dolomite ($CaMg(CO_3)_2$), huntite ($Mg_3Ca(CO_3)_4$), minrecordite ($CaZn(CO_3)_2$), barytocite ($BaCa(CO_3)_2$), azurite ($Cu_3(CO_3)_2(OH)_2$), hydrocerussite ($Pb_3(CO_3)_2(OH)_2$), malachite ($Cu_2CO_3(OH)_2$), rosasite (($Cu,Zn)_2CO_3(OH)_2$), phosgenite ($Pb_2(CO_3)Cl_2$), hydrozincite ($Zn_5(CO_3)_2(OH)_6$), aurichalcite (($Zn,Cu)_5(CO_3)_2(OH)_6$), hydromagnesite ($Mg_5(CO_3)_4(OH)_2.4H_2O$), ikaite ($CaCO_3.6(H_2O)$), lansfordite ($MgCO_3.5(H_2O)$), monohydrocalcite ($CaCO_3.H_2O$), natron ($Na_2CO_3.10(H_2O)$), and zellerite ($Ca(UO_2)(CO_3)_2.5(H_2O)$)).

The method can include fracturing the subterranean formation prior to placing the composition, wherein the fracturing forms the one or more fractures that are included in the subterranean formation and that are etched or wormholed by the composition including the acidic chelator or salt or ester thereof. The method can include placing a first pad fluid in the subterranean formation prior to placing the composition including the acidic chelator or salt or ester thereof in the subterranean formation. The first pad fluid can include a viscosifier, or can be free of viscosifiers. The first pad fluid can include a linear or crosslinked viscosifier. Placing the first pad fluid in the subterranean formation can include fracturing the subterranean formation with the first pad fluid to form the one or more fractures that are etched or wormholed by the composition including the acidic chelator or salt or ester thereof.

The method can include placing a second pad fluid in the subterranean formation after placing the first pad fluid in the subterranean formation and before placing the composition including the acidic chelator or salt or ester thereof in the subterranean formation. The method can include sequentially and repeatedly placing the first and second pad fluids in the subterranean formation prior to placing the composition including the acidic chelator or salt or ester thereof in the subterranean formation. The first pad fluid and the second pad fluid can both have viscosities greater than the viscosity of water, wherein the first pad fluid can have a higher viscosity than the second pad fluid. The first pad fluid can include a crosslinked viscosifier, and the second pad fluid can include a non-crosslinked viscosifier. Placing the first pad fluid in the subterranean formation, placing the second pad fluid in the subterranean formation, or a combination thereof, can form the one or more fractures. The composition including the acidic chelator or salt or ester thereof can be a second pad fluid, wherein the first pad fluid forms the one or more fractures. In some embodiments, the composition including the acidic chelator or salt or ester thereof can be a third pad fluid comprising proppant, injected after the second pad fluid.

In some embodiments, the composition including the acidic chelator or salt or ester thereof can be a second pad fluid. The composition including the acidic chelator or salt or ester thereof can include a viscosifier, or can be free of viscosifiers. The composition including the acidic chelator or salt or ester thereof can include a crosslinked viscosifier or a linear viscosifier. The second pad fluid (e.g., the composition including the acidic chelator or salt or ester thereof) can include a linear viscosifier, wherein the second pad fluid can have a lower viscosity than the first pad fluid (but a higher viscosity than water). The second pad fluid can be a foamed fluid including the acidic chelator or salt or ester thereof.

In some embodiments, the method can include placing a third pad fluid including a proppant (e.g., any proppant disclosed herein) in the subterranean formation after placing the first pad fluid and the composition including the acidic chelator or salt or ester thereof (as the second pad fluid) in the subterranean formation. The method can include sequentially and repeatedly placing the first pad fluid and the composition including the acidic chelator or salt or ester thereof in the subterranean formation. The method can include injecting a third pad fluid including a proppant into the subterranean formation after the sequential and repeated placement of the first pad fluid and the composition including the acidic chelator or salt or ester thereof in the subterranean formation.

In an embodiment, the composition including the acidic chelator or salt or ester thereof is a second pad fluid. The second pad fluid can comprise a linear non-crosslinked viscosifier and can have a lower viscosity than the first pad fluid. The second pad fluid can be injected sequentially and repeatedly with the first pad fluid to allow the highly viscous (or crosslinked) fluid to create a dominant fracture, while the low viscosity fluid forms multiple natural fractures or induced secondary fractures branching out from the dominant fracture. The method can include allowing the acidic chelating agent to be placed inside the dominant and secondary fractures to etch their surfaces for forming gaps or channels, preventing them from being completely closed. The method can include allowing the acidic chelating agent to form wormholes from and along the fissure surfaces. The method can include placing a third pad fluid containing a proppant (e.g., a microproppant) can be injected, allowing the proppant to be placed in the secondary fractures.

The second pad fluid can be injected sequentially and repeatedly with the first pad fluid to allow the highly viscous (or crosslinked) first pad fluid to create the dominant fracture, while the low viscosity second pad fluid forms multiple natural fractures or induced secondary fractures branching out from the dominant fracture. The method can include placing the acidic chelating agent inside the primary and secondary fractures to etch the surfaces of the primary and secondary fractures for etching and wormholing the fracture faces, preventing them from being completely closed.

In some embodiments, the composition including the acidic chelator or salt or ester thereof includes a proppant, a resin-coated proppant, an encapsulated resin, or a combination thereof. A proppant is a material that keeps an induced hydraulic fracture at least partially open during or after a fracturing treatment. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 0.0001 mm to about 3 mm, about 0.015 mm to about 2.5 mm, about 0.025 mm to about 0.43 mm, about 0.043 mm to about 0.85 mm, about 0.085 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition including the acidic chelator or salt or ester thereof can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more. The proppant can be an acid-resistant proppant.

In an embodiment, the composition including the acidic chelator or salt or ester thereof is a second pad fluid and includes a proppant, such as an acid-resistant, resin-coated microproppant. The second pad fluid can include a linear (e.g., including non-crosslinked viscosifier), low viscosity fluid (e.g., having lower viscosity than the first pad fluid but higher viscosity than water). The second pad fluid, including the proppant, can be injected sequentially and repeatedly with the first pad fluid to allow the highly viscous (or crosslinked) first pad fluid to create the dominant fracture, while the low viscosity fluid forms multiple natural fractures or induced secondary fractures branching out from the dominant fracture. The method can include allowing the acid/chelating agent to be placed inside the dominant and secondary fractures to etch their surfaces for forming gaps or channels, preventing them from being completely closed. The method can include allowing the acidic chelating to form wormholes from and along the fissure surfaces.

Acidic Chelator or Salt or Ester Thereof.

The method includes placing a composition including an acidic chelator or a salt or ester thereof in a subterranean formation that includes one or more fractures. As used herein, a "chelator" is a molecule that can chelate to or complex with ions (e.g., cations) in the subterranean formation, such as ions formed or released from the subterranean formation during the acidization thereof (e.g., during etching or wormholing of the faces of the one or more fractures in the subterranean formation by the acidic chelator or by another acid). The chelation or complexation can help keep the ions in solution and prevent their complexation with other materials and corresponding precipitation, resulting in improved permeability. In various embodiments, the acidic chelator avoids degradation of shale in the subterranean formation. In various embodiments, the acidic chelator acts selectively on carbonate minerals in the faces of the one or more fractures in the subterranean formation and preferentially dissolves the carbonate materials over the surrounding materials.

The salt or ester of the acidic chelator need not be acidic and need not be a chelator, so long as the free acid of the salt or ester is a chelator. The characteristic of being "acidic" indicates that the acidic chelator includes at least one acidic moiety, such as a carboxylic acid group, sulfonic acid group, phosphonic acid group, or combination thereof. The salt or ester of the acidic chelator can form the free acid of the acidic chelator en route to or at the desired location of treatment (e.g., the one or more fractures) in the subterranean formation.

The composition can include one acidic chelator or salt or ester thereof, or more than one acidic chelator or salt or ester thereof. The one or more acidic chelators, or salts or esters thereof, can form any suitable proportion of the composition including the acidic chelator. In some embodiments, the one or more acidic chelators, or salts or esters thereof, can be about 0.0001 wt % to about 100 wt % of the composition, about 0.0001 wt % to about 30 wt %, about 0.01 wt % to about 10 wt %, or about 0.0001 wt % or less, or less than, equal to, or greater than about 0.001 wt %, 0.005, 0.01, 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.5, 3, 3.5, 4, 4.5, 5, 6, 7, 8, 9, 10, 12, 14, 16, 18, 20, 25, 30, 35, 40, 45, 50, 60, 70, 80, 90, 95, 96, 97, 98, 99, 99.9, 99.99, or about 99.999 wt % or more.

The acidic chelator can be selected from the group consisting of a polycarboxylic acid, a polyaminopolycarboxylic acid, or a monoaminopolycarboxylic acid, a salt thereof, an ester thereof, or a combination thereof. The acidic chelator can be selected from the group consisting of ethylenediaminetetracetic acid (EDTA), N-(2-hydroxyethyl) ethylenediaminetriacetic acid (HEDTA), glutamic acid N,N-diacetic acid (GLDA), methyl-glycine-N,N-diacetic acid (MGDA), N-phosphonomethyl iminodiacetic acid (PMIDA), hydroxyiminodisuccinic acid (HIDS), P3-alanine diacetic acid, S,S-ethylenediaminedisuccinic acid, diethylenetriaminepentaacetic acid (DTPA), nitrilotriacetic acid (NTA), ethyleneglycoltetraacetic acid (EGTA), 1,2-bis (aminophenoxy) ethane-N,N,N',N'-tetraacetic acid (BAPTA), cyclohexanediaminetetraacetic acid (CDTA), triethylenetetraaminehexaacetic acid (TTHA), N-hydroxyethylaminodiacetic acid, 2-hydroxyethyliminodiacetic acid, malic acid, tartaric acid, citric acid, a salt thereof, an ester thereof, or a combination thereof. The acidic chelator can be selected from the group consisting of glutamic acid N,N-diacetic acid (GLDA), methyl-glycine-N,N-diacetic acid (MGDA), N-(2-hydroxyethyl)ethylenediaminetriacetic acid (HEDTA), N-phosphonomethyl iminodiacetic acid (PMIDA), a salt thereof, an ester thereof, or a combination thereof. The acidic chelator can be selected from the group consisting of N-phosphonomethyl iminodiacetic acid (PMIDA), a salt thereof, an ester thereof, or a combination thereof.

The acidic chelator can be in the form of a salt. The counterion of the salt can be any suitable counterion, such as $NH_4^+$, $Na^+$, $K^+$, $Li^+$, $Zn^{2+}$, $Al^{3+}$, $Ca^{2+}$, $Mg^{2+}$, or combinations thereof.

The acidic chelator can be in the form of an ester, such as a simple ester (e.g., an ester of the acidic chelator, such as an ester of a carboxylic acid, a sulfonic acid, or of phosphonic acid) or an orthoester (e.g., an ester of the orthoacid of the acidic chelator, such as an organo orthoformate or organo orthoacetate). The ester can be any suitable ester, such as a substituted or unsubstituted $(C_1-C_{20})$hydrocarbyl ester. The ester can be a $(C_1-C_5)$alkyl ester. The ester can be a methyl ester, an ethyl ester, or a combination thereof. In polyacid chelators, each ester can be independently selected. The ester of the acidic chelator can act as a delayed-release acidic chelator, becoming hydrolyzed to the free acid en route or at the desired location of treatment (e.g., the one or more fractures), avoiding spending the acid prematurely.

In some embodiments, the acidic chelator placed in the subterranean formation can be in the form of the free acid (e.g., the non-salt, non-ester form of the acidic chelator).

Other Components.

The composition including the acidic chelator or salt or ester thereof, or a mixture including the composition, can include any suitable additional component in any suitable proportion, such that the acidic chelator or salt or ester thereof, composition, or mixture including the same, can be used as described herein. Any component listed in this section can be present or not present in the composition or a mixture including the same.

In some embodiments, the composition or a mixture including the same includes one or more viscosifiers. The viscosifier can be any suitable viscosifier. The viscosifier can affect the viscosity of the composition or a solvent that contacts the composition at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.000,1 wt % to about 10 wt % of the composition or a mixture including the same, about 0.004 wt % to about 0.01 wt %, or about 0.000,1 wt % or less, 0.000,5 wt %, 0.001, 0.005, 0.01, 0.05, 0.1, 0.5, 1, 2, 3, 4, 5, 6, 7, 8, 9, or about 10 wt % or more of the composition or a mixture including the same.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly$((C_2-C_{10})$alkene), wherein the $(C_2-C_{10})$ alkene is substituted or unsubstituted. The viscosifier can include at least one of poly(acrylic acid) or $(C_1-C_5)$alkyl esters thereof, poly(methacrylic acid) or $(C_1-C_5)$alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, karaya gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted $(C_2-C_{50})$hydrocarbyl having at least one aliphatic unsaturated C—C bond therein, and a substituted or unsubstituted $(C_2-C_{50})$alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2- methylpropanesulfonic acid, a substituted or unsubstituted $(C_1-C_{20})$alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted $(C_1-C_{20})$alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, vinyl 3-ethylhexanoate, maleic anhydride, a substituted or unsubstituted $(C_1-C_{20})$alkenoic substituted or unsubstituted $(C_1-C_{20})$alkanoic anhydride, a substituted or unsubstituted $(C_1-C_{20})$alkenoic substituted or unsubstituted $(C_1-C_{20})$alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—$(C_1-C_{10})$alkenyl nitrogen-containing substituted or unsubstituted $(C_1-C_{10})$heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly(vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the composition or a mixture including the same can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a $(C_1-C_{30})$hydrocarbylboronic acid, a $(C_1-C_{30})$hydrocarbyl ester of a $(C_1-C_{30})$hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a $(C_1-C_{20})$alkylenebiacrylamide (e.g., methylenebisacrylamide), a poly$((C_1-C_{20})$alkenyl)-substituted mono- or poly-$(C_1-C_{20})$alkyl ether (e.g., pentaerythritol allyl ether), and a poly$(C_2-C_{20})$ alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000,01 wt % to about 5 wt % of the composition or a mixture including the same, about 0.001 wt % to about 0.01 wt %, or about 0.000,01 wt % or less, or about 0.000,05 wt %, 0.000,1, 0.000,5, 0.001, 0.005, 0.01, 0.05, 0.1, 0.5, 1, 2, 3, 4, or about 5 wt % or more.

In some embodiments, the composition or a mixture including the same can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphosphate, permanganate, chlorite, or hypochlorite ion. An enzymatic breaker can be at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the composition or a mixture including the same, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The composition, or a mixture including the composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The composition including the acidic chelator or salt or ester thereof, or a mixture including the same, can include any suitable downhole fluid. The composition including the acidic chelator or salt or ester thereof can be combined with any suitable downhole fluid before, during, or after the placement of the composition in the subterranean formation or the contacting of the composition and the subterranean material. In some examples, the composition including the acidic chelator or salt or ester thereof is combined with a downhole fluid above the surface, and then the combined composition is placed in a subterranean formation or contacted with a subterranean material. In another example, the composition including the acidic chelator or salt or ester thereof, or the acidic chelator or salt or ester thereof alone, is injected into a subterranean formation to combine with a downhole fluid, and the combined composition is contacted with a subterranean material or is considered to be placed in the subterranean formation. The placement of the composition in the subterranean formation can include contacting the subterranean material and the mixture. Any suitable weight percent of the composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture including the same.

In some embodiments, the composition, or a mixture including the same, can include any suitable amount of any suitable material used in a downhole fluid. For example, the composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, polyacrylamide, a polymer or combination of polymers, antioxidants, heat stabilizers, foam control agents, solvents, diluents, plasticizer, filler or inorganic particle, pigment, dye, precipitating agent, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the composition or a mixture including the same can include one or more additive components such as: X-TEND® II, PAC™-R, PAC™-L, LIQUI-VIS® EP, BRINEDRIL-VIS™, BARAZAN®, N-VIS®, and AQUAGEL® viscosifiers; PERFORMATROL®, GEM™, EZ-MUD®, CLAY GRABBER®, CLAYSEAL®, CRYSTAL-DRIL®, and CLAY SYNC™ II shale stabilizers; QUIK-THIN®, IRON-THIN™, THERMA-THIN®, and ENVIRO-THIN™ thinners; SOURSCAV™ scavenger; BARACOR® corrosion inhibitor. Any suitable proportion of the composition or mixture including the composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture.

In various embodiments, the composition or mixture can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.0001 mm to about 3 mm, about 0.015 mm to about 2.5 mm, about 0.025 mm to about 0.43 mm, about 0.043 mm to about 0.85 mm, about 0.085 mm to about 1.18 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

System or Apparatus.

In various embodiments, the present invention provides a system. The system can be any suitable system that can use or that can be generated by use of an embodiment of the composition described herein in a subterranean formation, or that can perform or be generated by performance of a method for using the composition described herein. The system can include a composition including an acidic chelator or a salt or ester thereof. The system can also include a subterranean formation including the composition therein, wherein the subterranean formation includes one or more fractures. In some embodiments, the composition in the system can also include a downhole fluid, or the system can include a mixture of the composition and downhole fluid. In some embodiments, the system can include a tubular, and a pump configured to pump the composition into the subterranean formation through the tubular.

In some embodiments, the system includes a tubular disposed in a subterranean formation including one or more fractures. The system can further include a pump configured to pump a composition including an acidic chelator or a salt or ester thereof in the subterranean formation through the tubular.

Various embodiments provide systems and apparatus configured for delivering the composition described herein to a subterranean location and for using the composition therein, such as for a fracturing operation (e.g., pre-pad, pad, slurry, or finishing stages), a stimulation operation, a remedial treatment operation, or an acidizing operation. In various embodiments, the system or apparatus can include a pump fluidly coupled to a tubular (e.g., any suitable type of oilfield pipe, such as pipeline, drill pipe, production tubing, and the like), with the tubular containing a composition including the acidic chelator or salt or ester thereof described herein.

In some embodiments, the system can include a drill string disposed in a wellbore, with the drill string including a drill bit at a downhole end of the drill string. The system can also include an annulus between the drill string and the wellbore. The system can also include a pump configured to circulate the composition through the drill string, through the drill bit, and back above-surface through the annulus. In some embodiments, the system can include a fluid processing unit configured to process the composition exiting the annulus to generate a cleaned drilling fluid for recirculation through the wellbore.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

FIG. 1 shows an illustrative schematic of systems and apparatuses that can deliver embodiments of the compositions of the present invention to a subterranean location, according to one or more embodiments. It should be noted that while FIG. 1 generally depicts a land-based system or apparatus, it is to be recognized that like systems and apparatuses can be operated in subsea locations as well. Embodiments of the present invention can have a different scale than that depicted in FIG. 1. As depicted in FIG. 1, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 1 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 1, at least part of the composition can, in some embodiments, flow back to wellhead 14 and exit subterranean formation 18. The composition that flows back can be substantially diminished in the concentration of acidic chelator or salt or ester thereof therein. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 1.

Composition for Treatment of a Subterranean Formation Including One or More Fractures.

Various embodiments provide a composition for treatment of a subterranean formation including one or more fractures. The composition can be any suitable composition that can be used to perform an embodiment of the method for treatment of a subterranean formation including one or more fractures described herein. For example, the composition can include an acidic chelator or a salt or ester thereof. In some embodiments, the composition can include or can be a fracturing fluid, such as a pad fluid. In some embodiments, the acidic chelator or salt or ester thereof can be N-phosphonomethyl iminodiacetic acid (PMIDA).

Method for Preparing a Composition for Treatment of a Subterranean Formation.

In various embodiments, the present invention provides a method for preparing a composition for treatment of a subterranean formation. The method can be any suitable method that produces a composition including an acidic chelator as described herein.

EXAMPLES

Various embodiments of the present invention can be better understood by reference to the following Examples which are offered by way of illustration. The present invention is not limited to the Examples given herein.

Example 1. Etching Effect of
N-(Phosphonomethyl)Iminodiacetic Acid (PMIDA)
Chelating Agent on Clay-Laden Shale Surfaces A treatment fluid including a chelating etching agent was evaluated for etching the surface of the fracture faces simulated by using an outcrop Eagle Ford shale core that had been split into two halves. The treatment fluid was prepared by diluting 2% volume per volume (v/v) Cla-Web™ clay stabilizer, 0.25% v/v SandWedge® ABC surface modification agent, and 0.1 lbm/gal N-(phosphonomethyl)iminodiacetic acid (PMIDA) chelating agent particulate in fresh water.

The two halves of the shale formation core samples were immersed in the treatment fluid in a beaker while the fluid was being stirred for 10 minutes at 140° F. (60° C.), which simulated exposure of fracture faces to the treatment fluid. The shale sample was removed and observed using a scanning electron microscope. The shale formation core samples were observed as having etched surfaces or wormholes within the samples, due to the solubilization of the carbonate material therein. Scanning electron microscope (SEM) images of the surfaces of the core samples are illustrated in FIGS. 2A-D.

Example 2. Permeability Measurements

The two halves of an outcrop Eagle Ford split core were immersed in a brine fluid containing a 2% volume per volume (v/v) Cla-Web clay stabilizer. They were then carefully matched, put back together, and installed in a Hassler sleeve to determine initial permeability of the split core. The confining pressure on the core was gradually increased to 1,200 psi and backpressure was set to 200 psi. The initial effective permeability measurements were determined with nitrogen gas at three different flow rates and their corresponding differential pressures by starting from the low flow rate.

A treatment fluid was prepared by diluting 2% volume per volume (v/v) Cla-Web™ clay stabilizer, 0.25% v/v SandWedge® ABC surface modification agent, and 0.005 pounds per gallon (ppg)N-(phosphonomethyl)iminodiacetic acid (PMIDA) chelating etching agent in fresh water. The core was then disassembled and the split faces of the two halves were immersed vertically in the treatment fluid for 10 min while the fluid was being stirred. After the immersion period, the treated halves were reassembled with their faces aligned together for core flow testing with nitrogen gas to determine the final effective permeability under the same closure stress and backpressure as applied in the initial permeability. Table 1 shows the final effective permeability measurements and percent permeability improvement of the split shale core after being treated with the treatment fluid.

TABLE 1

| Effective Permeability Measurements. | | | |
|---|---|---|---|
| $N_2$ Pressure (psi) | Initial Perm (mD) | Final Perm (mD) | % Improvement |
| 500 | 2.35 | 7.50 | 319 |
| 600 | 1.97 | 6.12 | 312 |
| 700 | 1.85 | 5.25 | 283 |

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:

placing in the subterranean formation a composition comprising an acidic chelator or a salt or ester thereof, wherein the subterranean formation comprises one or more fractures.

Embodiment 2 provides the method of Embodiment 1, further comprising fracturing the subterranean formation prior to placing the composition therein, wherein the fracturing forms the one or more fractures.

Embodiment 3 provides the method of any one of Embodiments 1-2, wherein the composition comprising the acidic chelator acidizes the one or more fractures.

Embodiment 4 provides the method of any one of Embodiments 1-3, wherein the composition comprising the acidic chelator or salt or ester thereof etches faces of the one or more fractures, forms wormholes in the faces of the one or more fractures, or a combination thereof.

Embodiment 5 provides the method of any one of Embodiments 1-4, wherein the method further comprises obtaining or providing the composition comprising the acidic chelator, wherein the obtaining or providing of the composition occurs above-surface.

Embodiment 6 provides the method of any one of Embodiments 1-5, wherein the method further comprises obtaining or providing the composition comprising the acidic chelator, wherein the obtaining or providing of the composition occurs in the subterranean formation.

Embodiment 7 provides the method of any one of Embodiments 1-6, wherein the subterranean formation comprises a shale formation.

Embodiment 8 provides the method of Embodiment 7, wherein the one or more fractures are in at least part of the shale formation.

Embodiment 9 provides the method of any one of Embodiments 7-8, wherein the shale formation comprises at least one carbonate mineral.

Embodiment 10 provides the method of any one of Embodiments 7-9, wherein the shale formation comprises one or more of calcite ($CaCO_3$), gaspeite (($Ni,Mg,Fe^{2+}$)$CO_3$), magnesite ($MgCO_3$), otavite ($CdCO_3$), rhodochrosite ($MnCO_3$), siderite ($FeCO_3$), smithsonite ($ZnCO_3$), spherocobaltite ($CoCO_3$), aragonite ($CaCO_3$), cerussite ($PbCO_3$), strontianite ($SrCO_3$), witherite ($BaCO_3$), rutherfordine ($UO_2CO_3$), natrite ($Na_2CO_3$), ankerite ($CaFe(CO_3)_2$), dolomite ($CaMg(CO_3)_2$), huntite ($Mg_3Ca(CO_3)_4$), minrecordite ($CaZn(CO_3)_2$), barytocite ($BaCa(CO_3)_2$), azurite ($Cu_3(CO_3)_2(OH)_2$), hydrocerussite ($Pb_3(CO_3)_2(OH)_2$), malachite ($Cu_2CO_3(OH)_2$), rosasite (($Cu,Zn)_2CO_3(OH)_2$), phosgenite ($Pb_2(CO_3)Cl_2$), hydrozincite ($Zn_5(CO_3)_2(OH)_6$), aurichalcite (($Zn,Cu)_5(CO_3)_2(OH)_6$), hydromagnesite ($Mg_5(CO_3)_4(OH)_2 \cdot 4H_2O$), ikaite ($CaCO_3 \cdot 6(H_2O)$), lansfordite ($MgCO_3 \cdot 5(H_2O)$), monohydrocalcite ($CaCO_3 \cdot H_2O$), natron ($Na_2CO_3 \cdot 10(H_2O)$), and zellerite ($Ca(UO_2)(CO_3)_2 \cdot 5(H_2O)$)).

Embodiment 11 provides the method of any one of Embodiments 1-10, wherein placing the composition comprising the acidic chelator in the subterranean formation enhances conductivity between the one or more fractures.

Embodiment 12 provides the method of any one of Embodiments 4-11, further comprising forming additional fractures, wherein the etched faces or wormholes serve as initiation points for the additional fractures.

Embodiment 13 provides the method of any one of Embodiments 1-12, wherein placing the composition comprising the acidic chelator in the subterranean formation at least partially dissolves a filter cake in the subterranean formation.

Embodiment 14 provides the method of any one of Embodiments 1-13, wherein the acidic chelator is placed in the subterranean formation in a solid form.

Embodiment 15 provides the method of any one of Embodiments 1-14, wherein the acidic chelator is placed in the subterranean formation encapsulated by a degradable solid material.

Embodiment 16 provides the method of any one of Embodiments 1-15, wherein the acidic chelator is placed in the subterranean formation in a liquid form.

Embodiment 17 provides the method of any one of Embodiments 1-16, wherein the composition comprising the acidic chelator is an aqueous composition.

Embodiment 18 provides the method of any one of Embodiments 1-17, wherein the composition comprising the acidic chelator is an oil-based composition.

Embodiment 19 provides the method of Embodiment 18, wherein the acidic chelator is placed in the subterranean formation in the form of an emulsion.

Embodiment 20 provides the method of any one of Embodiments 1-19, further comprising placing a first pad fluid in the subterranean formation prior to placing the composition comprising the acidic chelator in the subterranean formation.

Embodiment 21 provides the method of Embodiment 20, wherein the first pad fluid comprises a viscosifier.

Embodiment 22 provides the method of any one of Embodiments 20-21, wherein the first pad fluid comprises a crosslinked viscosifier.

Embodiment 23 provides the method of any one of Embodiments 20-22, wherein placing the first pad fluid in the subterranean formation comprises fracturing the subterranean formation with the first pad fluid to form the one or more fractures.

Embodiment 24 provides the method of Embodiment 23, wherein the composition is a second pad fluid.

Embodiment 25 provides the method of any one of Embodiments 23-24, wherein the composition comprises a viscosifier.

Embodiment 26 provides the method of any one of Embodiments 23-25, wherein the composition comprises a proppant.

Embodiment 27 provides the method of Embodiment 26, wherein the proppant is acid-resistant.

Embodiment 28 provides the method of any one of Embodiments 26-27, wherein the proppant is resin-coated.

Embodiment 29 provides the method of any one of Embodiments 23-28, further comprising placing a third pad fluid comprising a proppant in the subterranean formation after placing the first pad fluid and the composition comprising the acidic chelator in the subterranean formation.

Embodiment 30 provides the method of any one of Embodiments 24-29, further comprising sequentially and repeatedly placing the first pad fluid and the composition comprising the acidic chelator in the subterranean formation.

Embodiment 31 provides the method of Embodiment 30, further comprising injecting a third pad fluid comprising a proppant into the subterranean formation after the sequential and repeated placement of the first pad fluid and the composition comprising the acidic chelator in the subterranean formation.

Embodiment 32 provides the method of any one of Embodiments 20-31, further comprising placing a second pad fluid in the subterranean formation after placing the first pad fluid in the subterranean formation and before placing the composition comprising the acidic chelator in the subterranean formation.

Embodiment 33 provides the method of Embodiment 32, further comprising sequentially and repeatedly placing the first and second pad fluids in the subterranean formation prior to placing the composition comprising the acidic chelator in the subterranean formation.

Embodiment 34 provides the method of any one of Embodiments 32-33, wherein the first pad fluid and the second pad fluid both have viscosities greater than the viscosity of water, wherein the first pad fluid has a higher viscosity than the second pad fluid.

Embodiment 35 provides the method of Embodiment 34, wherein the first pad fluid comprises a crosslinked viscosifier, and wherein the second pad fluid comprises a non-crosslinked viscosifier.

Embodiment 36 provides the method of any one of Embodiments 32-35, wherein placing the first pad fluid in the subterranean formation, placing the second pad fluid in the subterranean formation, or a combination thereof, forms the one or more fractures.

Embodiment 37 provides the method of Embodiment 36, wherein the composition is a third pad fluid.

Embodiment 38 provides the method of any one of Embodiments 23-37, wherein the composition comprises a viscosifier.

Embodiment 39 provides the method of any one of Embodiments 23-38, wherein the composition comprises a proppant.

Embodiment 40 provides the method of any one of Embodiments 1-39, wherein the acidic chelator is in the form of a salt, wherein the counterion is selected from the group consisting of $NH_4^+$, $Na^+$, $K^+$, $Li^+$, $Zn^{2+}$, $Al^{3+}$, $Ca^{2+}$, $Mg^{2+}$, or combinations thereof.

Embodiment 41 provides the method of any one of Embodiments 1-40, wherein the acidic chelator is in the form of an ester, wherein the ester is a simple ester or an orthoester, wherein the ester is a substituted or unsubstituted $(C_1-C_{20})$hydrocarbyl ester.

Embodiment 42 provides the method of Embodiment 41, wherein the ester is a $(C_1-C_5)$alkyl ester.

Embodiment 43 provides the method of any one of Embodiments 41-42, wherein the ester is a methyl ester, an ethyl ester, or a combination thereof.

Embodiment 44 provides the method of any one of Embodiments 1-43, wherein the acidic chelator, salt thereof, or ester thereof, is in the form of a free acid.

Embodiment 45 provides the method of any one of Embodiments 1-44, wherein the acidic chelator, or salt or ester thereof, is about 0.0001 wt % to about 30 wt % of the composition comprising the acidic chelator.

Embodiment 46 provides the method of any one of Embodiments 1-45, wherein the acidic chelator, or salt or ester thereof, is about 0.01 wt % to about 10 wt % of the composition comprising the acidic chelator.

Embodiment 47 provides the method of any one of Embodiments 1-46, wherein the acidic chelator is selected from the group consisting of a polycarboxylic acid, a polyaminopolycarboxylic acid, or a monoaminopolycarboxylic acid, a salt thereof, an ester thereof, or a combination thereof.

Embodiment 48 provides the method of any one of Embodiments 1-47, wherein the acidic chelator is selected from the group consisting of ethylenediaminetetracetic acid (EDTA), N-(2-hydroxyethyl)ethylenediaminetriacetic acid (HEDTA), glutamic acid N,N-diacetic acid (GLDA), methyl-glycine-N,N-diacetic acid (MGDA), N-phosphonomethyl iminodiacetic acid (PMIDA), hydroxyiminodisuccinic acid (HIDS), β-alanine diacetic acid, S,S-ethylenediaminedisuccinic acid, diethylenetriaminepentaacetic acid (DTPA), nitrilotriacetic acid (NTA), ethyleneglycoltetraacetic acid (EGTA), 1,2-bis(aminophenoxy) ethane-N,N,N',N'-tetraacetic acid (BAPTA), cyclohexanediaminetetraacetic acid (CDTA), triethylenetetraaminehexaacetic acid (TTHA), N-hydroxyethylaminodiacetic acid, 2-hydroxyethyliminodiacetic acid, malic acid, tartaric acid, citric acid, a salt thereof, an ester thereof, or a combination thereof.

Embodiment 49 provides the method of any one of Embodiments 1-48, wherein the acidic chelator is selected from the group consisting of glutamic acid N,N-diacetic acid (GLDA), methyl-glycine-N,N-diacetic acid (MGDA), N-(2-hydroxyethyl)ethylenediaminetriacetic acid (HEDTA), N-phosphonomethyl iminodiacetic acid (PMIDA), a salt thereof, an ester thereof, or a combination thereof.

Embodiment 50 provides the method of any one of Embodiments 1-49, wherein the acidic chelator is selected from the group consisting of N-phosphonomethyl iminodiacetic acid (PMIDA), a salt thereof, an ester thereof, or a combination thereof.

Embodiment 51 provides the method of any one of Embodiments 1-50, wherein the composition comprising the acidic chelator is a stimulation fluid, a fracturing fluid, remedial treatment fluid, acidizing fluid, or a combination thereof.

Embodiment 52 provides the method of any one of Embodiments 1-51, wherein at least one of prior to, during, and after the placing of the composition in the subterranean formation, the composition is used in the subterranean formation, at least one of alone and in combination with other materials, as a stimulation fluid, a fracturing fluid, remedial treatment fluid, acidizing fluid, or a combination thereof.

Embodiment 53 provides the method of any one of Embodiments 1-52, wherein the composition comprising the acidic chelator further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, polyacrylamide, polymer or combination of polymers, antioxidant, heat stabilizer, foam control agent, solvent, diluent, plasticizer, filler or inorganic particle, pigment, dye, precipitating agent, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 54 provides the method of any one of Embodiments 1-53, wherein the placing of the composition in the subterranean formation comprises fracturing at least part of the subterranean formation to form at least one subterranean fracture.

Embodiment 55 provides the method of any one of Embodiments 1-54, wherein the composition further comprises a proppant, a resin-coated proppant, or a combination thereof.

Embodiment 56 provides the method of any one of Embodiments 1-55, wherein the placing of the composition in the subterranean formation comprises pumping the composition through a tubular disposed in a wellbore and into the subterranean formation.

Embodiment 57 provides a system for performing the method of any one of Embodiments 1-56, the system comprising:
a tubular disposed in the subterranean formation; and
a pump configured to pump the composition in the subterranean formation through the tubular.

Embodiment 58 provides a method of treating a subterranean formation, the method comprising:
placing in the subterranean formation a composition comprising an acidic chelator that is N-phosphonomethyl iminodiacetic acid (PMIDA), wherein the subterranean formation comprises one or more fractures, wherein the acidic chelator is about 0.01 wt % to about 10 wt % of the composition.

Embodiment 59 provides a system comprising:
a tubular disposed in a subterranean formation comprising one or more fractures; and
a pump configured to pump a composition comprising an acidic chelator or a salt or ester thereof in the subterranean formation through the tubular.

Embodiment 60 provides a composition for treatment of a subterranean formation comprising one or more fractures, the composition comprising:
an acidic chelator or a salt or ester thereof.

Embodiment 61 provides the method, system, or composition any one or any combination of Embodiments 1-60 optionally configured such that all elements or options recited are available to use or select from.

What is claimed is:

1. A method of treating a subterranean formation, comprising:
injecting a first pad fluid in the subterranean formation to form one or more primary fractures in the subterranean formation; then
injecting a second pad fluid in the subterranean formation to form secondary fractures in the subterranean formation branching out from the primary fractures, wherein the second pad fluid has a lower viscosity than the first pad fluid; then
repeating injecting the first and second pad fluids; and
injecting a composition into the subterranean formation, wherein the composition comprises an acidic chelator selected from the group consisting of: ethylenediaminetetracetic acid (EDTA), N-(2-hydroxyethyl)ethylenediaminetriacetic acid (HEDTA), glutamic acid N,N-diacetic acid (GLDA), methyl-glycine-N,N-diacetic acid (MGDA), N-phosphonomethyl iminodiacetic acid (PMIDA), hydroxyiminodisuccinic acid (HIDS), (3-alanine diacetic acid, S,S-ethylenediaminedisuccinic acid, diethylenetriaminepentaacetic acid (DTPA), nitrilotriacetic acid (NTA), ethyleneglycoltetraacetic acid (EGTA), 1,2-bis(aminophenoxy) ethane-N,N,N',N'-tetraacetic acid (BAPTA), cyclohexanediaminetetraacetic acid (CDTA), triethylenetetraaminehexaacetic acid (TTHA), N-hydroxyethylaminodiacetic acid, 2-hydroxyethyliminodiacetic acid, malic acid, tartaric acid, citric acid, a salt thereof, an ester thereof, or a combination thereof, wherein the composition is contained in the second pad fluid, or wherein the composition is contained in a third pad fluid injected after the repeated injection of the first and second pad fluids; and
enhancing a connectivity between the primary fractures and the secondary fractures with the composition.

2. The method of claim 1, wherein the subterranean formation comprises a shale formation, and wherein the one or more primary and secondary fractures are in at least part of the shale formation.

3. The method of claim 1, wherein the acidic chelator is encapsulated by a degradable solid material.

4. The method of claim 1, wherein the composition comprising the acidic chelator is an oil-based composition, and wherein the acidic chelator is placed in the subterranean formation in the form of an emulsion.

5. The method of claim 1, wherein the composition further comprises a non-crosslinked viscosifier and a microproppant, wherein injecting the composition comprises placing the microproppant in the secondary fractures, and wherein the microproppant is acid-resistant and resin-coated.

6. The method of claim 1, wherein the second pad fluid comprises a non-crosslinked viscosifier and a microproppant, wherein injecting the second pad fluid comprises placing the microproppant in the secondary fractures.

7. The method of claim 1, wherein the composition is contained in a third pad fluid injected after the repeated injection of the first and second pad fluids, further comprising injecting a fourth pad fluid comprising a non-crosslinked viscosifier and a microproppant into the subterranean formation after injecting the composition in the subterranean formation, wherein injecting the fourth pad fluid comprises placing the microproppant in the secondary fractures.

8. The method of claim 1, wherein the first pad fluid and the second pad fluid both have viscosities greater than the viscosity of water.

9. The method of claim 8, wherein the first pad fluid comprises a crosslinked viscosifier, and wherein the second pad fluid comprises a non-crosslinked viscosifier.

10. The method of claim 1, wherein the acidic chelator is in the form of an ester, wherein the ester is a simple ester or an orthoester, and wherein the ester is a (C1-C5)alkyl ester.

11. The method of claim 10, wherein the ester is a methyl ester, an ethyl ester, or a combination thereof.

12. The method of claim 1, wherein the acidic chelator, or salt or ester thereof, is about 0.01 wt % to about 10 wt % of the composition comprising the acidic chelator.

13. The method according to claim 1, wherein enhancing the connectivity between the primary fractures and the secondary fractures with the composition is etching the face of one or more of the primary and secondary fractures, forming wormholes in the faces of one or more of the primary and secondary fractures, forming wormholes along the faces of one or more of the primary and secondary fractures, or any combination thereof.

14. The method of claim 1, wherein enhancing the connectivity between the primary fractures and the secondary fractures with the composition comprises at least partially dissolving a filter cake in the subterranean formation.

15. The method of claim 14, wherein enhancing the connectivity between the primary fractures and the secondary fractures with the composition further comprises removing the filter cake.

16. A method of treating a subterranean formation, comprising:
injecting a first pad fluid in the subterranean formation to form one or more primary fractures in the formation; then
injecting a second pad fluid in the subterranean formation to form secondary fractures in the subterranean formation branching out from the primary fractures, wherein the second pad fluid has a lower viscosity than the first pad fluid; then repeating injecting the first and second pad fluids; and injecting in the subterranean formation a composition comprising an acidic chelator that is N-phosphonomethyl iminodiacetic acid (PMIDA), and wherein the acidic chelator is about 0.01 wt % to about 10 wt % of the composition, wherein the composition is contained in the second pad fluid, or wherein the composition is contained in a third pad fluid injected after the repeated injection of the first and second pad fluids; and enhancing a connectivity between the primary fractures and the secondary fractures with the composition.

17. The method according to claim 16, wherein enhancing the connectivity between the primary fractures and the secondary fractures with the composition is etching the face of one or more of the primary and secondary fractures, forming wormholes in the faces of one or more of the primary and secondary fractures, forming wormholes along the faces of one or more of the primary and secondary fractures, or any combination thereof.

18. The method of claim 16, wherein enhancing the connectivity between the primary fractures and the secondary fractures with the composition comprises at least partially dissolving a filter cake in the subterranean formation.

19. The method of claim 18, wherein enhancing the connectivity between the primary fractures and the secondary fractures with the composition further comprises removing the filter cake.

* * * * *